(12) United States Patent
Bregani et al.

(10) Patent No.: US 11,193,810 B2
(45) Date of Patent: Dec. 7, 2021

(54) VALIDATION OF FLUID LEVEL SENSORS (71) Applicant: PRATT & WHITNEY CANADA CORP., Longueuil (CA)

(72) Inventors: Benjamin Bregani, Montreal (CA); Sean McCarthy, Beaconsfield (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/778,963

(22) Filed: Jan. 31, 2020

(65) Prior Publication Data

US 2021/0239510 A1 Aug. 5, 2021

(51) Int. Cl.
G01F 25/00 (2006.01)
G01F 23/74 (2006.01)
G01F 23/68 (2006.01)

(52) U.S. Cl.
CPC ........ G01F 25/0069 (2013.01); G01F 23/686 (2013.01); G01F 23/74 (2013.01)

(58) Field of Classification Search
CPC .... G01F 25/0069; G01F 23/74; G01F 23/686; G01F 25/0061; G01F 25/0076; G01F 23/72
USPC ......... 73/1.73, 1.74, 305–308, 314, 319–322
See application file for complete search history.

(56) References Cited

U.S. PATENT DOCUMENTS

| | | | |
|---|---|---|---|
| 5,400,010 A | 3/1995 | Lechevalier | |
| 5,586,466 A | 12/1996 | Steiner | |
| 5,723,870 A | 3/1998 | Crowne et al. | |
| 6,157,894 A | 12/2000 | Hess et al. | |
| 6,653,846 B2 | 11/2003 | James | |
| 7,581,434 B1 | 9/2009 | Discenzo et al. | |
| 8,103,462 B2 | 1/2012 | Liu et al. | |
| 8,230,835 B2 | 7/2012 | Gibson et al. | |
| 8,262,019 B2 | 9/2012 | Schmidt et al. | |
| 8,401,760 B2 | 3/2013 | Payne et al. | |
| 8,483,902 B2 | 7/2013 | Cornet et al. | |
| 8,528,400 B2 | 9/2013 | Luce | |
| 8,674,685 B2 | 3/2014 | Paradise | |
| 8,676,436 B2 | 3/2014 | Raimarckers et al. | |
| 8,887,509 B2 | 11/2014 | Bonner | |
| 9,222,822 B2 | 12/2015 | Sinha et al. | |

(Continued)

FOREIGN PATENT DOCUMENTS

CN 100510655 7/2009
CN 102621508 8/2012
(Continued)

*Primary Examiner* — Robert R Raevis
(74) *Attorney, Agent, or Firm* — Norton Rose Fulbright Canada LLP (57) ABSTRACT

Methods and systems for validating a fluid level sensor having a floating element are provided. First readings are acquired from the fluid level sensor indicative of fluid levels sensed via the floating element during a first period of operation of the fluid level sensor. A validated range of fluid levels for the fluid level sensor is determined based on the first readings. At least one second reading is acquired from the fluid level sensor during a second period of operation, subsequent to the first period of operation. A starting position of the floating element for the second period of operation is determined based on the at least one second reading. When the starting position of the floating element is within the validated range, validating the at least one second reading.

20 Claims, 5 Drawing Sheets

(56) References Cited

U.S. PATENT DOCUMENTS

| | | |
|---|---|---|
| 9,464,902 B2 | 10/2016 | Isler et al. |
| 9,518,873 B2 | 12/2016 | Bellamkonda et al. |
| 9,540,974 B2 | 1/2017 | Demaison et al. |
| 2005/0007272 A1 | 1/2005 | Smith et al. |
| 2010/0185360 A1* | 7/2010 | Windbergs .......... G01F 23/0076 701/29.2 |
| 2013/0325212 A1 | 12/2013 | Wickman |
| 2014/0260576 A1* | 9/2014 | Sweppy .............. G01F 25/0069 73/114.54 |
| 2016/0258377 A1* | 9/2016 | Wang .................... F02D 41/222 |
| 2017/0184138 A1 | 6/2017 | Smith et al. |
| 2019/0032573 A1 | 1/2019 | Priat et al. |
| 2019/0170565 A1 | 6/2019 | Duan et al. |

FOREIGN PATENT DOCUMENTS

| | | |
|---|---|---|
| CN | 205898445 | 1/2017 |
| CN | 107054691 | 8/2017 |
| DE | 102009039445 | 3/2011 |
| EP | 0690293 | 1/1996 |
| WO | 2019122658 | 6/2019 |

* cited by examiner

VALIDATION OF FLUID LEVEL SENSORS

TECHNICAL FIELD

The present disclosure relates generally to fluid level sensors, and specifically to validation of fluid level sensors.

BACKGROUND OF THE ART

Fluid level sensors have long been used in a variety of applications, including in various types of vehicles, such as automobiles, ships, and aircraft. As the most common form of fuel for such vehicles is liquid, such as petroleum-based fuel, fluid level sensors are used to provide information regarding a remaining stock of fuel, to avoid fuel shortage situations. In addition to fuel levels, the levels of various other fluids, such as coolant, lubricant, and the like, may also be of interest, and fluid level sensors are often used to inform operators and/or service personnel of remaining quantities of the various fluids, for instance to avoid shortages.

While existing fluid level sensors are suitable for their intended purpose, it may be desirable to validate the operation of fluid level sensors. In some cases, accessing a fluid level sensor during operation can be difficult.

As such, there is room for improvement.

SUMMARY

In accordance with at least one broad aspect, there is provided a method for validating a fluid level sensor having a floating element. First readings are acquired from the fluid level sensor indicative of fluid levels sensed via the floating element during a first period of operation of the fluid level sensor. A validated range of fluid levels for the fluid level sensor is determined based on the first readings, the validated range bounded by an upper bound and a lower bound and being contained within a range of values of the first readings. At least one second reading is acquired from the fluid level sensor during a second period of operation, subsequent to the first period of operation. A starting position of the floating element for the second period of operation is determined based on the at least one second reading. When the starting position of the floating element is within the validated range, validating the at least one second reading.

In accordance with another broad aspect, there is provided a system for validating a fluid level sensor having a floating element. The system comprises a processing unit, and a non-transitory computer-readable medium having instructions stored thereon. The instructions are executable by the processing unit for: acquiring first readings from the fluid level sensor indicative of fluid levels sensed via the floating element during a first period of operation of the fluid level sensor; determining a validated range of fluid levels for the fluid level sensor based on the first readings, the validated range bounded by an upper bound and a lower bound and being contained within a range of values of the first readings; acquiring at least one second reading from the fluid level sensor during a second period of operation, subsequent to the first period of operation; determining, based on the at least one second reading, a starting position of the floating element for the second period of operation; and when the starting position of the floating element is within the validated range, validating the at least one second reading.

Features of the systems, devices, and methods described herein may be used in various combinations, in accordance with the embodiments described herein.

DESCRIPTION OF THE DRAWINGS

Reference is now made to the accompanying figures in which.

It will be noted that throughout the appended drawings, like features are identified by like reference numerals.

DETAILED DESCRIPTION

A fluid level sensor can serve to provide information about the quantity of fluid present in a reservoir. The reservoir can be any suitable kind of reservoir, and can be used to store any suitable kind of fluid, including fuels, lubricant, coolant, fluid for consumption, for use in industrial processes, and the like. Depending on the nature of the fluid in the reservoir, the embodiments of fluid level sensors disclosed herein can be packaged in protective casings or otherwise shielded from the fluid using any suitable techniques.

Figure 1:
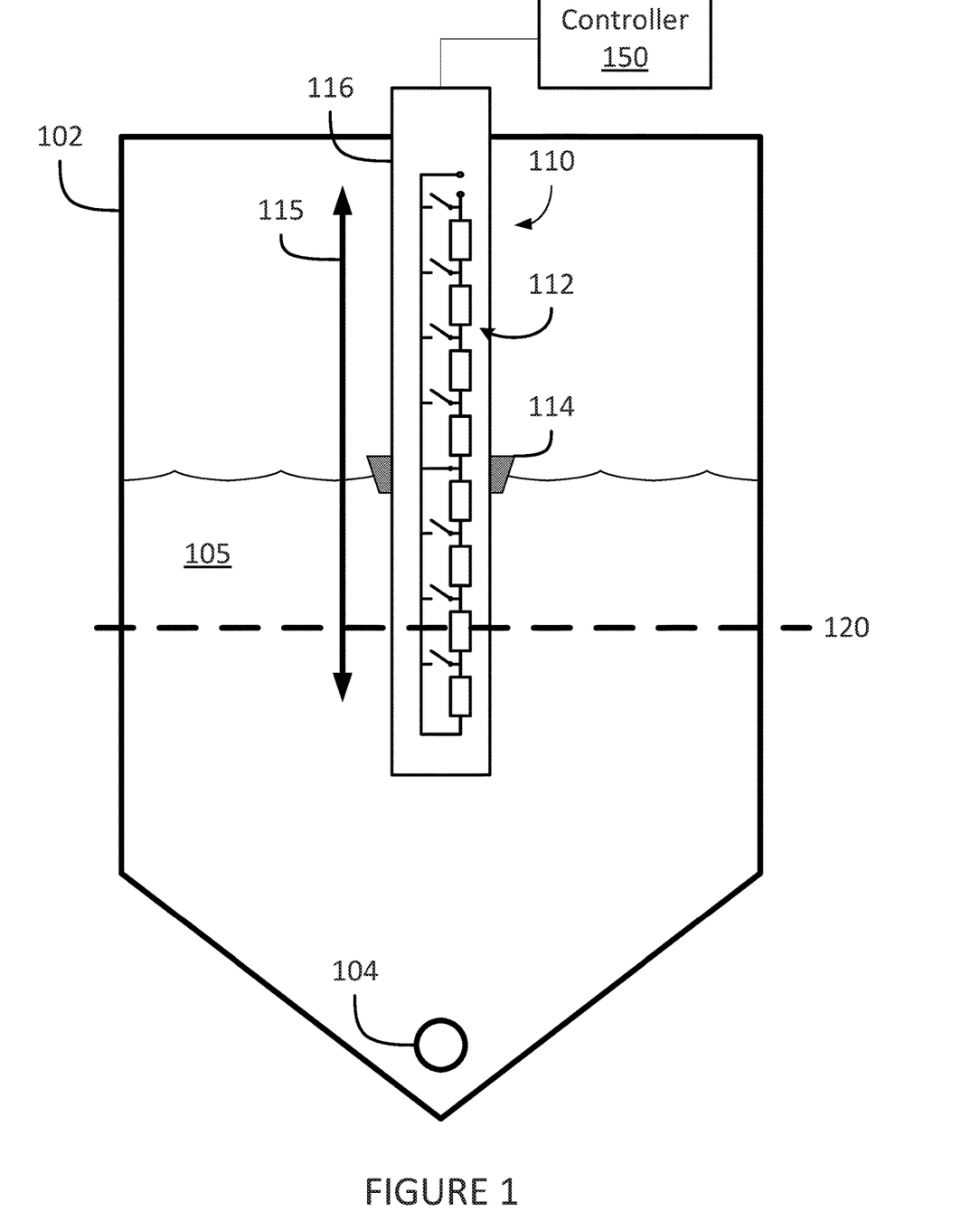
FIG. 1 is a cutaway side view of an example fluid level sensor.

With reference to FIG. 1, there is shown a fluid level sensor 110 disposed in a reservoir 102. The reservoir 102 contains a certain quantity of a fluid 105. The reservoir 102 can have any suitable shape and size, and is formed to contain the fluid 105. In some embodiments, the reservoir 102 is substantially closed, thereby substantially completely encapsulating the fluid 105 and, optionally, the fluid level sensor 110. In some other embodiments, the reservoir 102 is partially open, for instance at a top surface thereof, via which fluid 105 can be added to the reservoir 102. The reservoir 102 is provided with a fluid output 104, via which the fluid 105 can be fed from the reservoir 102 to other systems. For example, if the reservoir 102 is an oil reservoir for an engine, the fluid output 104 can serve to provide a flow of fluid 105, for instance oil, to the engine. The flow of the fluid 105 from the reservoir 102 can be controlled via pumps, valves, or other fluidic systems, as appropriate.

The fluid level sensor 110 can be affixed to the reservoir 102 in any suitable fashion. In some cases, the fluid level sensor 110 is affixed to the reservoir 102 via a lid or other top surface of the reservoir. For example, the lid of the reservoir 102 can have defined therein an aperture for receiving the fluid level sensor 110. In some other cases, the fluid level sensor 110 is affixed to a side wall of the reservoir 102. In still other cases, the fluid level sensor 110 is retained within the reservoir 102 in some other fashion.

The fluid level sensor 110 is composed of a sensing circuit 112 and floater 114, which are retained within and/or on a sensor structure 116. The sensor structure 116 can be a tubular member or other elongated structure for receiving, retaining, and/or supporting the sensing circuit 112 and the floater 114, as appropriate. For instance, the sensing circuit 112 can be disposed within a tubular cavity of the sensor structure 116, and the floater 114 can be provided with an aperture through which the sensor structure 116 is insertable, such that the floater 114 is retained by the sensor structure on an outer surface thereof. Other configurations are also considered. For instance, the floater 114 can be retained by the sensor structure 116, and the sensing circuit can be disposed on an inner or an outer surface of the reservoir 102.

The floater 114 moves along a floater path, illustrated by arrow 115, in response to changes in the quantity of fluid 105 in the reservoir 102. The floater path defines the range of motion of the floater 114, hereinafter referred to as the floater range 115. The floater 114 can be any suitable device which exhibits buoyancy when placed in the fluid 105. In some embodiments, the floater 114 is hollow, or contains a hollow area, to provide buoyancy. In some embodiments, the floater 114 is a plastic disk. In other embodiments, the floater is a plastic cylinder. Still other types of floaters 114 are considered.

In addition, the floater 114 is provided with one or more elements which produce a stimuli which will interact with elements of the sensing circuit 112, as will be described in greater detail hereinbelow. In some embodiments, the floater 114 is provided with magnetic elements which produce a magnetic field. In other embodiments, the floater 114 is provided with various electrical elements which produce an electric field. In further embodiments, the floater 114 is provided with optical elements. For example, the floater 114 is provided with light-emitting elements which emit a particular type of light, for instance ultraviolet, visible, or infrared light. In another example, the floater 114 is provided with one or more reflective elements which reflect light provided within the reservoir 102, for example from a light source. Still other types of elements are considered, and in some other embodiments the floater 114 combines a plurality of types of elements.

The sensing circuit 112 is composed of a plurality of passive elements in a first branch of the sensing circuit 112, and of a plurality of switching elements disposed between the first branch and a second branch of the sensing circuit 112. Sensing terminals are arranged at corresponding ends of the first and second branches of the sensing circuit 112. The passive elements can be any suitable passive element, including resistors, capacitors, inductors, and the like. The passive elements can be of any suitable value: in some embodiments, all of the passive elements are substantially of the same value (e.g., each 100Ω, each 10 μF, each 10 mH, etc.); in other embodiments, the passive elements can be assigned different values. The passive elements can be connected to one another in any suitable fashion, including using a breadboard, on a printed circuit-board, and the like.

The switching elements can be any device which actuates a switch between an open and a closed state in response to external stimuli. The switching elements can respond to magnetic, electric, optical, or other stimuli, as appropriate, based on the particular stimuli produced by the floater 114. For example, if the floater 104 includes a magnetic element, suitable for producing a magnetic field, the switching elements 136 are magnetically-switched elements, which change their state, for instance from open to closed, when the floater 104 is proximate to the switching elements 136. In another example, the floater 104 includes an optical element producing optical stimuli, and the switching elements 136 include optically-switched elements, for instance based on photodiodes.

The fluid level sensor 110 detects the level of the fluid 105 within the reservoir 102 based on the movement of the floater 114 within the reservoir 102. As the floater 114 moves, the stimuli produced by the floater 114 will cause different ones of the switching elements within the sensing circuit 112 to switch. Since altering which of the switching elements is closed alters the configuration of the sensing circuit 112, the effective value of the passive elements as sensed from the sensing terminals will vary. This variation can then be correlated with the level of the fluid 105 with the reservoir 102. In some embodiments, a controller 150 is communicatively coupled to the fluid level sensor 110, for instance to the sensing circuit 112, to obtain information about the level of the fluid 105 within the reservoir 102. The controller 150 can be associated with the reservoir 102, or with a larger system of which the reservoir 102 is an element. For instance, the reservoir 102 can serve to provide the fluid 105 to an engine or other system, and the controller 150 can be a controller for the engine. Other types of systems are also considered. For instance, the aforementioned engine can be an engine of an aircraft, which can include one or more engines, and the reservoir 102 and supply fuel to the one or more engines of the aircraft.

With continued reference to FIG. 1, in some embodiments a "low fluid level" 120 can be defined for the reservoir 102, for instance by the controller 150. The low fluid level 120 can be any suitable predefined level for the fluid 105. For example, the low fluid level 120 can be associated with a minimum level of the fluid 105 for the controller to authorize certain operations. Alternatively, or in addition, the low fluid level 120 can be associated with a level of fluid below which the reservoir 102 should not be permitted to be used. When the controller 150 detects the fluid level at or below the low fluid level 120, the controller 150 can raise an alert, indicate that a maintenance operation be performed, or the like.

For example, the reservoir 102 is an oil reservoir for an engine of an aircraft or other vehicle, and the low fluid level 120 is a "low oil level". The controller 150 can be configured for validating whether the level of the fluid 105 within the reservoir 102—in this case, oil—is above the low oil level prior to, or at the time of, starting the engine associated therewith. When the controller 150 determines that the oil level is above the low oil level, the controller 150 can indicate to an operator of the engine and/or the aircraft that a suitable level of oil is within the reservoir 102. Conversely, when the controller 150 determines that the oil level is below, or optionally at, the low oil level 120, the controller 150 can indicate to an operator of the engine and/or the aircraft that the reservoir 102 does not contain a sufficient amount of oil, and halt starting of the engine, recommend a maintenance action, or otherwise alert an operator of the engine or aircraft that the amount of oil remaining in the reservoir is below the low oil level.

In configurations in which the floater 114 is retained in some fashion via the sensor structure 116, it can occur that movement of the floater 114 along the floater range 115 is obstructed. For instance, debris, residue, or other particulate matter within the fluid 105 can become lodged between the floater 114 and the sensor structure 116. As a result, the floater 114 can remain at a level along the floater range 115 which is above the current level of the fluid 105 within the reservoir 102. This can result in the fluid level sensor 110 providing inaccurate readings to the controller 105, including readings indicating that the level of the fluid 105 within the reservoir 102 is higher than the actual level of the fluid. It should be noted that the floater 114 can also become obstructed in other configurations. For instance, similar particulate matter can cause the floater 114 to become caught on a side wall of the reservoir 102, or on another structure within the reservoir 102, which in turn can obstruct proper movement of the floater. Described herein are systems and methods for validating a fluid level sensor having a floating element, for instance the floater 114. The techniques described herein are applicable to a variety of configurations of the fluid level sensor 110, in which movement of the floater 114 can be obstructed, and serve to validate the readings provided by the fluid level sensor 110, for instance to the controller 150.

Figure 2:
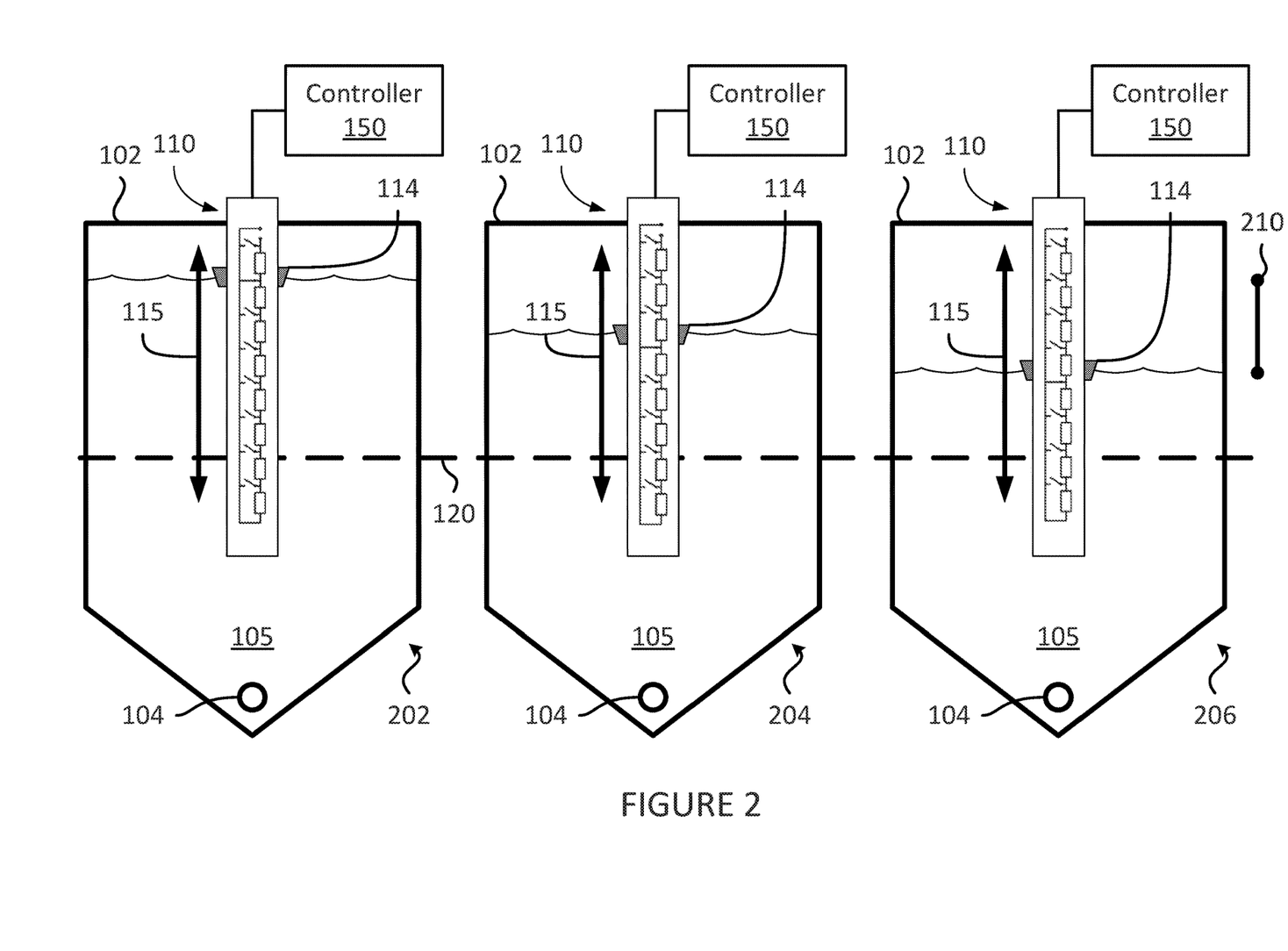
FIG. 2 are multiple cutaway side views of the example fluid level sensor of FIG. 1 at different fluid levels.

With reference to FIG. 2, the reservoir 102 is illustrated in three different states, indicated at 202, 204, and 206 (collectively "the states 202-206"). Each of the states 202-206 is associated with a different level of the fluid 105: in state 202, the fluid 105 is at a higher level than in states 204, 206; in state 206, the fluid 105 is at a lower level than in states 202, 204; and the level of the fluid 105 in state 204 is intermediate to the level of the fluid 105 in states 202, 206. The states 202-206 are indicative of how the level of the fluid 105 can vary over time, for instance during operation of a system (engine, aircraft, or otherwise) of which the reservoir 102 is an element.

For example, state 202 indicates the level of the fluid 105 at the start of a period operation for the reservoir 102. Over time, the fluid 105 is consumed, exiting the reservoir 102 via a fluid output 104, for instance to be provided to an engine, aircraft, or other system. The fluid 105 can be consumed by engine or aircraft, whether as part of its normal operation, or as part of a so-called "gulping" process, by which a rapid intake of the fluid 105 from the reservoir 102 is performed at the start of a period of operation. Variations in temperature, air pressure, and altitude can also change the density of the fluid 105, which can in turn result in changes in the level of the fluid 105. At a later time, the reservoir 102 can be in the state 204, and/or at the state 206. In some cases, fluid can circulate back to the reservoir 102, for instance after a filtering process. As a result, the reservoir 102 can successively pass between one or more of the states 202-206, as well as to any number of intermediate states associated with other levels for the fluid 105.

As the level of the fluid 105 in the reservoir 102 changes, the floater 114 can be detected by the controller 150 as having traversed a portion of the floater range 115, based on the readings produced by the fluid level sensor 110. The portion of the floater range 115 which is traversed by the floater 114 is indicative of the range of levels for the fluid 105 which were reported by the fluid level sensor 110 in the form of readings provided to the controller 150. The controller 150 uses the readings produced by the fluid level sensor 110 to determine a validated range for the fluid level sensor, indicated by the bounded range 210.

The validated range 210 for the fluid level sensor 110 is bounded by an upper value and a lower value, and can be determined in various fashions. In some embodiments, the readings obtained by the controller 150 during a first period of operation (for instance, aligning with the states 202-206) are analyzed to determine maximum and minimum readings obtained by the controller 150. The validated range 210 can then be set as the range bounded by the maximum and minimum readings, corresponding to the upper and lower values bounding the validated range 210.

In some other embodiments, the readings obtained by the controller 150 during the first period of operation are analyzed, and a predetermined number of maximum and minimum values are discarded, for instance to limit the risk of outliers being used when setting the validated range 210. The upper and lower bounds for the validated range 210 can then be set by remaining maximum and minimum values, after discarding the predetermined number of values. In some other embodiments, the readings obtained by the controller 150 are analyzed statistically in one or more fashions, and the validated range 210 is set based on the statistical analysis. For example, readings corresponding to values outside a predetermined number of standard deviations from the mean can be discarded. In another example, a mean value for the readings is calculated, and the validated range 210 is set as a particular percentage of the range of readings obtained by the controller 150. Other approaches are also considered.

In some situations, the validated range 210 determined during a particular period of operation can be concatenated with other validated ranges determined during previous periods of operation. For instance, in cases in which the validated range 210 overlaps at least partially with previously-validated ranges for the fluid level sensor 110, the validated range 210 and the previously-validated ranges can be concatenated to produce a broader validated range for the fluid level sensor. Alternatively, or in addition, if the period of operation associated with the validated range 210 occurred in close temporal proximity to previous periods of operations, having respective associated validated ranges, the validated ranges can be concatenated. For instance, if a shutdown period for a system of which the reservoir 102 is an element between a previous period of operation and the period of operation associated with the validated range 210 is below a predetermined threshold, the validated range 210 can be concatenated with the previously-validated range. Other approaches are also considered.

In some embodiments, when a maintenance operation is performed on the reservoir 102, the controller 150 is programmed to cancel, delete, or otherwise reset any previously-determined validated ranges. The maintenance operation can include servicing the reservoir 102 and/or the fluid level sensor 110, adding or removing fluid from the reservoir 102, and the like. These maintenance operations can, in some instances, result in the addition of debris to the reservoir 102, which can in turn result in the floater 114 becoming obstructed as it travels the floater range 115. As a result, the controller 150 is configured to reset any previously-stored validated ranges following a maintenance operation.

The process of determining a validated range for the fluid level sensor 110 can be repeated, with or without concatenation, for every period of operation in which the reservoir 102 and the fluid level sensor 110 are used. Every validated range serves, at least, for the following period of operation of the reservoir 102 and the fluid level sensor 110, and can be used to assess whether readings from the fluid level sensor 110 are valid or not.

Figure 3A:
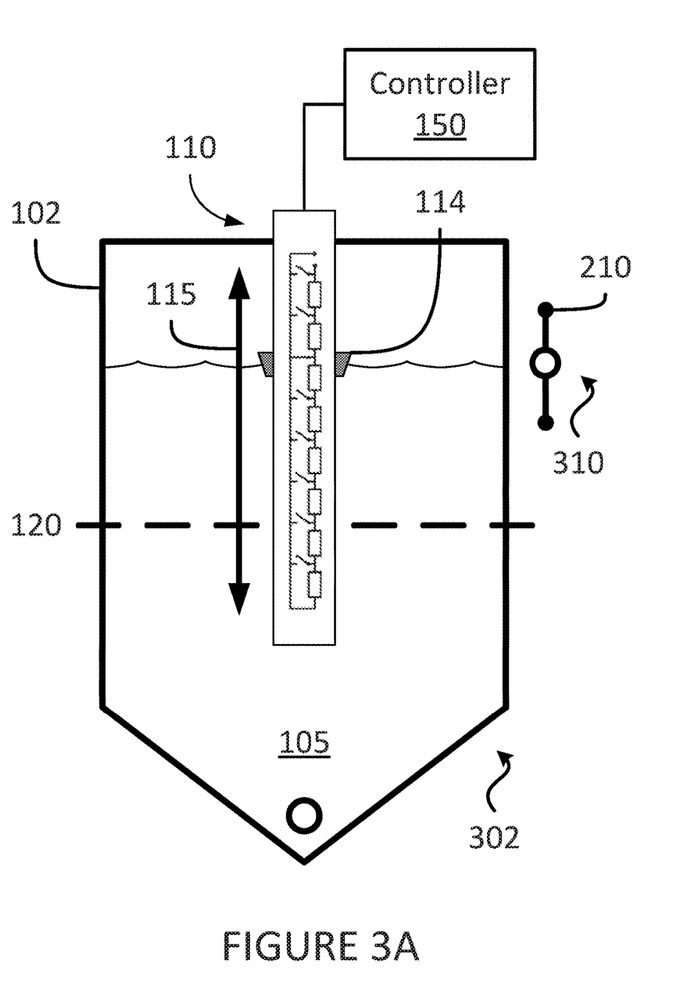
FIG. 3A is a cutaway side view of the example fluid level sensor of FIG. 1 having a validated starting position.
Figure 3B:
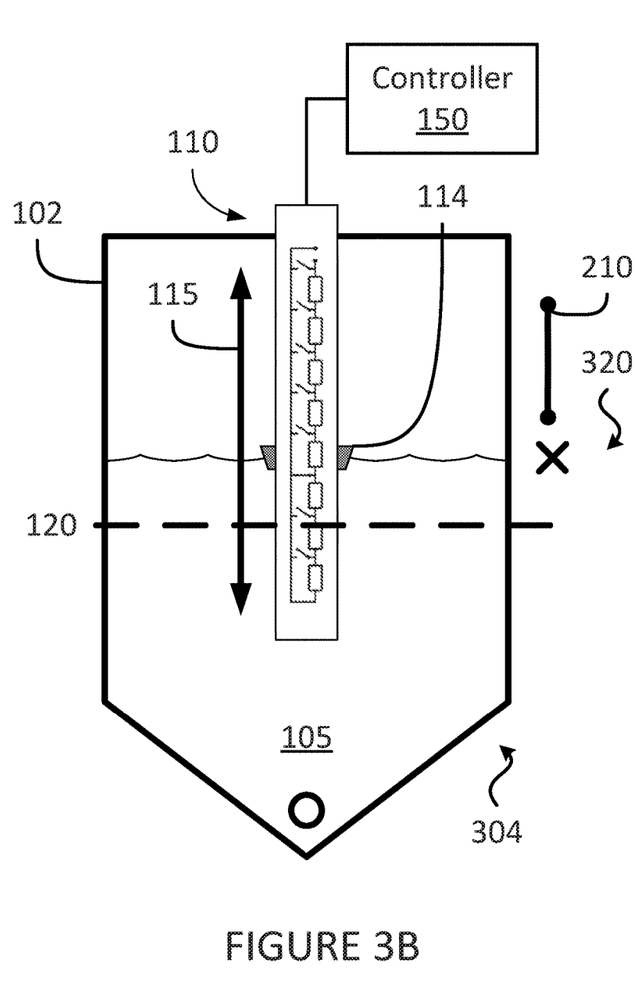
FIG. 3B is a cutaway side view of the example fluid level sensor of FIG. 1 having a non-validated starting position.

With reference to FIGS. 3A-B, there are illustrated two states 302, 304 for the reservoir 102 at the start of a subsequent period of operation, that is to say, a second period of operation subsequent to a first period of operation in which the validated range 210 is determined. The first period of operation can, for instance, be associated with a first flight performed by an aircraft in which the reservoir 102 is disposed, and the second period of operation can be associated with a second, subsequent flight, which the aircraft is about to embark upon. Other operational contexts are also considered.

In FIG. 3A, at the start of the second period of operation in state 302, the controller obtains one or more readings from the fluid level sensor 110. The controller 150 determines a starting position for the floater 114 based on the readings, illustrated here as element 310. The starting position 310 is a position along the floater range 115 and/or along the validated range 210 which is substantially commensurate with the position of the floater 114 at the start of the second period of operation. It should be noted, however, that when operations begin within the engine or other system of which the reservoir 102 is an element, variations in the level of the fluid 105 can occur, and that in some cases the starting position 310 as determined by the controller 150 is not strictly defined as the absolute position of the floater 114 at the start of the second period of operation.

The controller 150 then compares the starting position 310 of the floater 114 to the validated range 210. When the starting position 310 of the floater 114 falls within the validated range 210, as illustrated in FIG. 3A, then the readings provided to the controller 150 by the fluid level sensor 110 during the second period of operation are considered to be valid. The validated range 210 is based on the controller 150 having determined that the floater 114 can move unobstructed within the validated range 210 during the previous period of operation (associated with the states 202-206 of FIG. 2). As a result, when the starting position 310 of the floater 114 is found within the validated range 210 at the start of the second period of operation, the controller 150 can infer that the floater 114 can at least move without obstruction through the validated range 210. The controller 150 can additionally infer, based on readings produced by the fluid level sensor 110 during the second period of operation, the extent of a subsequent validated range for the second period of operation, and can optionally concatenate the subsequent validated range to the validated range 210 from the first period of operation.

In some embodiments, after validating the second readings from the fluid level sensor 110, the controller 150 can issue an alert or indication, for instance to an operator of the engine or aircraft of which the reservoir 102 is an element, indicating that the fluid level sensor 110 has been validated. In other embodiments, the controller 150 can block or withhold authorization of one or more operations, for instance starting an engine or permitting takeoff of an aircraft, until the readings from the fluid level sensor 110 are validated. Once the readings from the fluid level sensor 110 are validated, the controller 150 can authorize the operations to occur or be implemented.

In FIG. 3B, the controller 150 can similarly obtain one or more readings from the fluid level sensor at the start of the second period of operation, in state 304. The controller 150 determines a starting position for the floater 114 based on the readings, illustrated here as element 320. Because the starting position 320 for the floater 114 in state 304 is outside the validated range 210, the controller 150 does not know whether the region around the starting position for the floater 114 could potentially inhibit movement of the floater 114 along the floater range 115. As a result, the controller 150 does not validate the second readings provided by the fluid level sensor 110.

In some embodiments, when the starting position 320 for the floater 114 during the second period of operation is outside the validated range 210, obtained from the previous period of operation, an alert is raised, for instance by the controller 150. The alert can be raised for an operator of an engine, aircraft, or other system of which the reservoir 102 is an element. For example, a light indicator, audible alarm, textual alert, or the like, can be presented to the operator. In another example, the alert can indicate a maintenance action that should be performed on the fluid level sensor 110 and/or on the reservoir 102. Other types of alerts are also considered.

In some other embodiments, the controller 150 is configured to estimate the fluid level within the reservoir 102 at the start of the second period of operation in response to failing to validate the second readings. The controller 150 uses the level of the fluid 105 at the start of the first period of operation (e.g., the fluid level in state 202 of FIG. 2) and the duration in time of the first period of operation to estimate the level of fluid 105 that remains at the end of the first period of operation. For example, the controller 150 can maintain a log of the duration (in hours, minutes, seconds, or the like) for each of the periods of time during which the system for which the reservoir 102 is an element was operational. In the case of an aircraft, the controller 150 can maintain a log of the duration of each flight mission, for instance in a database or other memory store. In another example, a flight log can be accessible to the controller 150, which can retrieve information on the duration of past flight missions.

For example, the reservoir 102 is used as part of an engine of an aircraft, and the controller 150 can use a standard value for the amount of the fluid 105 that is used by the engine per hour under normal operating conditions. The estimated amount of used fluid is subtracted from the amount of the fluid 105 that was present at the start of the first period of operation to estimate the amount of the fluid 105 that remained at the end of the first period of operation. Since the first and second period of operations follow one another, the amount of fluid 105 remaining at the end of the first period of operation should be substantially equivalent to the amount of fluid 105 that is present at the start of the second period of operation. The controller 150 can thus assign the estimated level of the fluid 105 as a starting fluid level for the second period of operation, and discard the second readings provided by the fluid level sensor.

In some embodiments, the controller 150 can then use the estimated starting fluid level for the second period of operation to determine whether the level of the fluid 105 in the reservoir 102 is above the low fluid level 120. For example, the low fluid level 120 can be a minimum level of oil which must be present for an aircraft to be permitted to perform a flight mission. When the estimated starting oil level is above the low oil level 120, the controller 150 can indicate, for instance to an operator of the aircraft, that while the readings of the fluid level sensor 110 cannot be validated, the estimated level of oil within the reservoir 102 is above the low oil level, and the flight mission can proceed. Alternatively, when the estimated starting oil level is below the low oil level 120, the controller 150 can raise an alert indicating to the operator that the flight mission cannot proceed, and that there is a risk of a low oil level within the reservoir 102. Other approaches are also considered.

In some embodiments, the process of estimating the starting fluid level for the second period of operation is performed in a conservative manner, for instance by using worst-case scenario calculations for the estimated amount of fluid consumption during the first period of operation. In some other embodiments, the estimated starting fluid level is compared against a variable low fluid level 120, which can be based on an estimated duration for the second, subsequent period of operation. For instance, the second period of operation can be associated with a flight mission having an estimated duration, and the low fluid level 120 can be calculated based on an estimated amount of the fluid 105 which will be used during the second period of operation.

Although the foregoing discussion focuses primarily on accounting for situations in which the floater 114 is obstructed and unable to move along the floater range 115, it should be noted that the systems and methods described herein can also be used to validate readings from a fluid level sensor, for instance the fluid level sensor 110, in the event of a failure of the sensing circuit 112. This can include switches which can be stuck open or stuck short, switches which are damaged, non-responsive passive elements, and the like. The methods and systems described herein can also be used to validate readings for the fluid level sensor 100 in the event of the floater 114 losing the ability to produce stimuli which affects the sensing circuit 112, for instance becoming demagnetized.

Figure 4:
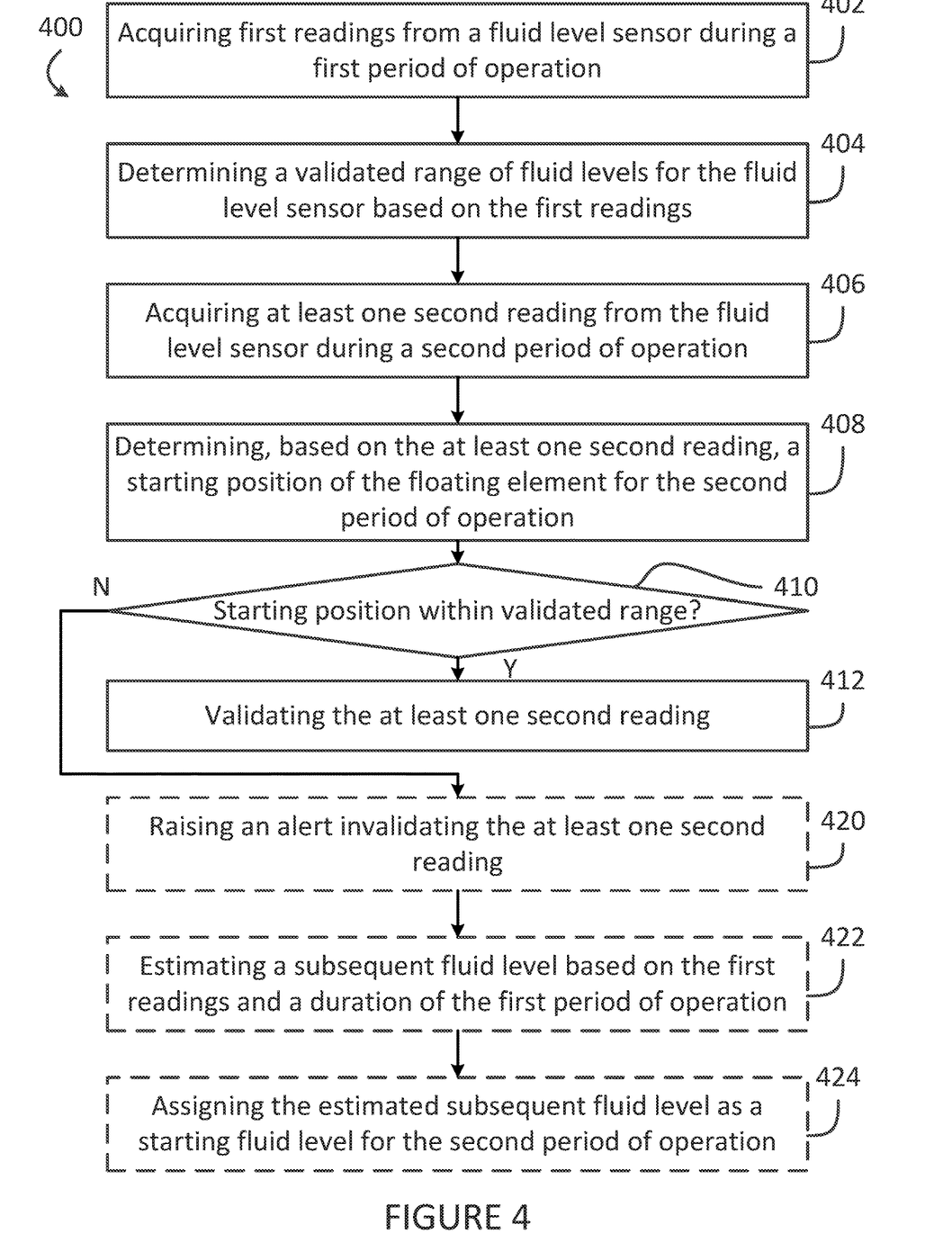
FIG. 4 is a flowchart of an example method for validating a fluid level sensor.

With reference to FIG. 4, there is provided a method 400 for validating a fluid level sensor having a floating element, for instance the fluid level sensor 110 with the floater 114. At step 402, during a first period of operation, first readings from the fluid level sensor 110 are acquired. The first readings can be acquired, for example, by a controller associated with the fluid level sensor, for instance the controller 150. The first readings can include any suitable number of readings and can be acquired at any suitable frequency and in any suitable format.

At step 404, a validated range of fluid levels for the fluid level sensor 110 is determined based on the first readings, for instance the validated range 210. The validated range is bounded by an upper bound and a lower bound, and is contained within a range of values of the first readings. For example, the upper bound can correspond to a maximum value of the first readings, and the lower bound can correspond to a minimum value of the first readings. Other approaches are also considered.

At step 406, during a second period of operation subsequent to the first period of operation, at least one second reading is acquired from the fluid level sensor 110. The second readings can be any suitable number of readings, and can be acquired similarly to the first readings.

At step 408, a starting position for the floater 114 for the second period of operation is determined based on the at least one second reading. In some embodiments, the starting position is identified as the first one of the second readings produced by the fluid level sensor 110. In some other embodiments, the starting position is identified as an average of a plurality of first ones of the second readings. In some further embodiments, the starting position is estimated based one or more first ones of the second readings. Other approaches are also considered.

At decision step 410, a determination is made regarding whether the starting position for the floater 114 for the second period of operation is within the validated range 210. When the starting position is within the validated range 210, the method 400 proceeds to step 412. When the starting position is not within the validated range 210, the method proceeds to one or more of steps 420, 422, and 424. It should be noted that although each of steps 420, 422, and 424 are optional, certain embodiments of the method 400 will include at least one of the steps 420, 422, 424.

At step 412, when the starting position of the floater 114 is found to be within the validated range, the second readings produced by the fluid level sensor 110 are validated. In some embodiments, this involves the controller 150 issuing an indication to an operator that the fluid level sensor 110 has been validated. In some other embodiments, validating the second readings results in other operations being performed by the controller 150.

Optionally, when the starting position is not within the validated range 210, the method proceeds to step 420. At step 420, an alert is raised to invalidate the at least one second reading. For example, the controller 150 can raise an alert, which can be presented to the operator. In some embodiments, the alert indicates a maintenance operation or other corrective action to be performed in order to address the lack of validation of the second readings.

Optionally, when the starting position is not within the validated range 210, the method proceeds to step 422; alternatively, the method 400 can move from step 420 to step 422, in embodiments in which step 420 is performed. At step 422, a subsequent fluid level is estimated based on the first readings and a duration of the first period of operation. The subsequent fluid level is indicative of the level of the fluid 105 within the reservoir 102 at the start of the second period of operation, and can be estimated using values for the average or worst-case consumption of the fluid 105 during the first period of operation. The duration of time of first period of operation can be known to the controller 150, or can be obtained from a database or other data store, as appropriate.

Optionally following step 422, at step 424, the estimated subsequent fluid level is assigned as a starting fluid level for the second period of operation. The starting fluid level can then be compared to a predetermined minimum fluid level, for instance the low fluid level 120. The low fluid level 120 can be fixed, or can be based on an estimated duration of the second period of operation. If the starting fluid level is found to be below the low fluid level 120, an alert can be raised indicating that the level of the fluid 105 within the reservoir 102 is insufficient or unsafe.

Figure 5:
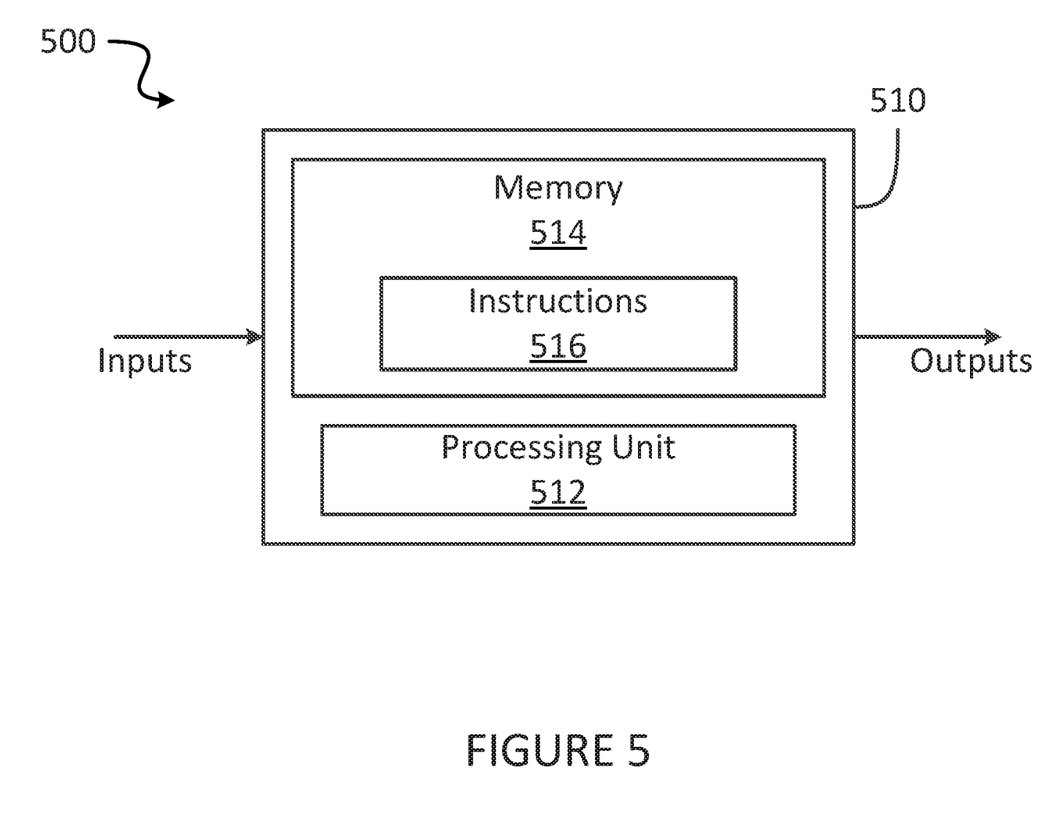
FIG. 5 is a block diagram of an example computing device for implementing the method of FIG. 4.

With reference to FIG. 5, the method 400 may be implemented by a computing device 510, which can embody part or all of the controller 150. The computing device 510 comprises a processing unit 512 and a memory 514 which has stored therein computer-executable instructions 516. The processing unit 512 may comprise any suitable devices configured to implement the functionality of the controller 150 and/or the functionality described in the method 400, such that instructions 516, when executed by the computing device 510 or other programmable apparatus, may cause the functions/acts/steps performed by the controller 150 and/or described in the method 400 as provided herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

It should be noted that the computing device 510 may be implemented as part of a FADEC or other similar device, including electronic engine control (EEC), engine control unit (EUC), engine electronic control system (EECS), and the like. In addition, it should be noted that the techniques described herein can be performed by the controller 150 substantially in real-time, during operation of the engine 100, for example during a flight mission.

The methods and systems for validating a fluid level sensor having a floating element, as described herein, may be implemented in a high level procedural or object oriented programming or scripting language, or a combination thereof, to communicate with or assist in the operation of a computer system, for example the computing device 510. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having computer instructions and/or a computer program stored thereon. The computer program may comprise computer-readable instructions which cause a computer, or more specifically the processing unit 512 of the computing device 510, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for validating a fluid level sensor having a floating element, comprising:
   acquiring first readings from the fluid level sensor indicative of fluid levels sensed via the floating element during a first period of operation of the fluid level sensor;
   determining a validated range of fluid levels for the fluid level sensor based on the first readings, the validated range bounded by an upper bound and a lower bound and being contained within a range of values of the first readings;
   acquiring at least one second reading from the fluid level sensor during a second period of operation, subsequent to the first period of operation;
   determining, based on the at least one second reading, a starting position of the floating element for the second period of operation; and
   validating the at least one second reading by comparing the at least one second reading to the validated range, wherein a valid reading corresponds to the second reading falling within the validated range and an invalid reading corresponds to the second reading falling outside the validated range.

2. The method of claim 1, wherein determining the validated range comprises:
   determining the upper bound of the validated range based on a maximum reading of the first readings;
   determining the lower bound of the validated range based on a minimum reading of the first readings; and
   establishing the validated range as located between the upper bound of the validated range and the lower bound of the validated range.

3. The method of claim 2, wherein determining the validated range further comprises appending the validated range to a previously-validated range determined during at least one previous periods of operation preceding the first period of operation.

4. The method of claim 1, further comprising:
   estimating a subsequent fluid level based on the first readings and a duration of the first period of operation in response to the invalid reading; and
   assigning the estimated subsequent fluid level as a starting fluid level for the second period of operation.

5. The method of claim 4, further comprising:
   comparing the starting fluid level to a predetermined minimum fluid level; and
   raising an alert in response to the starting fluid level being below the predetermined minimum fluid level.

6. The method of claim 5, wherein the predetermined minimum fluid level is determined based on an estimated duration of the second period of operation.

7. The method of claim 4, further comprising obtaining a duration of the first period of operation.

8. The method of claim 1, further comprising raising an alert in response to the invalid reading.

9. The method of claim 8, wherein raising the alert comprises providing an indication of a maintenance operation to be performed on the fluid level sensor.

10. The method of claim 1, further comprising resetting the validated range following a maintenance operation being performed on the fluid level sensor.

11. A system for validating a fluid level sensor having a floating element, comprising:
   a processing unit; and
   a non-transitory computer-readable medium having stored thereon instructions executable by the processing unit for:
      acquiring first readings from the fluid level sensor indicative of fluid levels sensed via the floating element during a first period of operation of the fluid level sensor;
      determining a validated range of fluid levels for the fluid level sensor based on the first readings, the validated range bounded by an upper bound and a lower bound and being contained within a range of values of the first readings;
      acquiring at least one second reading from the fluid level sensor during a second period of operation, subsequent to the first period of operation;
      determining, based on the at least one second reading, a starting position of the floating element for the second period of operation; and
      when the starting position of the floating element is within the validated range, validating the at least one second reading.

12. The system of claim 11, wherein determining the validated range comprises:
   determining the upper bound of the validated range based on a maximum reading of the first readings;
   determining the lower bound of the validated range based on a minimum reading of the first readings; and establishing the validated range as located between the upper bound of the validated range and the lower bound of the validated range.

13. The system of claim 12, wherein determining the validated range further comprises appending the validated range to a previously-validated range determined during at least one previous periods of operation preceding the first period of operation.

14. The system of claim 11, further comprising, when the starting position of the floating element is outside the validated range:
estimating a subsequent fluid level based on the first readings and a duration of the first period of operation; and
assigning the estimated subsequent fluid level as a starting fluid level for the second period of operation.

15. The system of claim 14, further comprising:
comparing the starting fluid level to a predetermined minimum fluid level; and
raising an alert when the starting subsequent fluid level is below the predetermined minimum fluid level.

16. The system of claim 15, wherein the predetermined minimum fluid level is determined based on an estimated duration of the second period of operation.

17. The system of claim 14, further comprising obtaining a duration of the first period of operation.

18. The system of claim 11, further comprising, when the starting position of the floating element is outside the validated range, raising an alert invalidating the at least one second reading.

19. The system of claim 18, wherein raising the alert comprises providing an indication of a maintenance operation to be performed on the fluid level sensor.

20. The system of claim 11, further comprising resetting the validated range following a maintenance operation being performed on the fluid level sensor.

* * * * *